United States Patent
Watt et al.

(10) Patent No.: US 11,900,248 B2
(45) Date of Patent: Feb. 13, 2024

(54) CORRELATING DATA CENTER RESOURCES IN A MULTI-TENANT EXECUTION ENVIRONMENT USING MACHINE LEARNING TECHNIQUES

(71) Applicant: Dell Products L.P., Round Rock, TX (US)

(72) Inventors: James S. Watt, Austin, TX (US); Bijan K. Mohanty, Austin, TX (US); Bhaskar Todi, Madhya Pradesh (IN)

(73) Assignee: Dell Products L.P., Round Rock, TX (US)

(*) Notice: Subject to any disclaimer, the term of this patent is extended or adjusted under 35 U.S.C. 154(b) by 682 days.

(21) Appl. No.: 17/070,498

(22) Filed: Oct. 14, 2020

(65) Prior Publication Data

US 2022/0114437 A1   Apr. 14, 2022

(51) Int. Cl.
*G06N 3/08* (2023.01)
*G06N 3/04* (2023.01)
(Continued)

(52) U.S. Cl.
CPC ......... *G06N 3/08* (2013.01); *G06F 16/24568* (2019.01); *G06F 16/953* (2019.01);
(Continued)

(58) Field of Classification Search
CPC .. G06F 16/953; G06F 18/2433; G06F 18/211; G06F 18/2135; G06F 18/2413;
(Continued)

(56) References Cited

U.S. PATENT DOCUMENTS 10,270,788 B2    4/2019   Faigon et al.
2014/0310714 A1* 10/2014  Chan ............... G06F 16/285
                                                 718/102
(Continued)

OTHER PUBLICATIONS

Karpathy, A, CS231n Convolutional Neural Networks for Visual Recognition, 2017, Stanford University https://web.archive.org/web/20170813100358/http://cs231n.github.io/ (Year: 2017).*

(Continued)

*Primary Examiner* — Shane D Woolwine
(74) *Attorney, Agent, or Firm* — Ryan, Mason & Lewis, LLP

(57) ABSTRACT

Methods, apparatus, and processor-readable storage media for correlating data center resources in a multi-tenant execution environment using machine learning techniques are provided herein. An example computer-implemented method includes obtaining multiple data streams pertaining to one or more data center resources in at least one multi-tenant executing environment; correlating one or more portions of the multiple data streams by processing at least a portion of the multiple data streams using at least one multi-tenant-capable search engine; determining one or more anomalies within the multiple data streams by processing the one or more correlated portions of the multiple data streams using a machine learning-based anomaly detection engine; and performing at least one automated action based at least in part on the one or more determined anomalies.

20 Claims, 10 Drawing Sheets

(51) Int. Cl.

| | | |
|---|---|---|
| *G06F 16/953* | (2019.01) | |
| *H04L 65/60* | (2022.01) | |
| *H04L 41/16* | (2022.01) | |
| *G06F 18/2433* | (2023.01) | |
| *G06F 16/2455* | (2019.01) | |
| *G06N 3/045* | (2023.01) | |
| *G06N 3/088* | (2023.01) | |
| *H04L 65/80* | (2022.01) | |
| *G06N 3/042* | (2023.01) | |
| *G06F 18/211* | (2023.01) | |
| *G06F 18/2135* | (2023.01) | |
| *G06F 18/2413* | (2023.01) | |
| *H04L 65/75* | (2022.01) | |
| *G06Q 10/0637* | (2023.01) | |
| *G06Q 10/0639* | (2023.01) | |
| *G06Q 10/10* | (2023.01) | |

(52) U.S. Cl.
CPC ........... *G06F 18/2433* (2023.01); *G06N 3/04* (2013.01); *G06N 3/042* (2023.01); *G06N 3/045* (2023.01); *G06N 3/088* (2013.01); *H04L 41/16* (2013.01); *H04L 65/60* (2013.01); *H04L 65/80* (2013.01); *G06F 18/211* (2023.01); *G06F 18/2135* (2023.01); *G06F 18/2413* (2023.01); *G06Q 10/0639* (2013.01); *G06Q 10/06375* (2013.01); *G06Q 10/10* (2013.01); *H04L 65/765* (2022.05)

(58) Field of Classification Search
CPC ... G06F 16/24568; H04L 41/16; H04L 65/60; H04L 65/765; H04L 65/80; G06N 3/04; G06N 3/042; G06N 3/045; G06N 3/08; G06N 3/088; G06N 20/00; G06N 20/10; G06N 20/20; G06Q 10/06375; G06Q 10/0639; G06Q 10/10
See application file for complete search history.

(56) References Cited

U.S. PATENT DOCUMENTS

| | | | |
|---|---|---|---|
| 2017/0222521 A1* | 8/2017 | Sun | H02K 9/223 |
| 2019/0245876 A1 | 8/2019 | Faigon et al. | |
| 2020/0074269 A1* | 3/2020 | Trygg | G06V 10/761 |
| 2021/0064500 A1* | 3/2021 | Przestrzelski | G06F 11/079 |
| 2021/0067531 A1* | 3/2021 | Meir | G06F 21/552 |
| 2021/0117416 A1* | 4/2021 | Sriharsha | G06N 20/00 |

OTHER PUBLICATIONS

Wikipedia, Prometheus (software), https://en.wikipedia.org/w/index.php?title=Prometheus_(software)&oldid=979569052, Sep. 21, 2020.

Wikipedia, Elasticsearch, https://en.wikipedia.org/w/index.php?title=Elasticsearch&oldid=982468229, Oct. 8, 2020.

Wikipedia, Grafana, https://en.wikipedia.org/w/index.php?title=Grafana&oldid=983130605, Oct. 12, 2020.

Wikipedia, Kibana, https://en.wikipedia.org/w/index.php?title=Kibana&oldid=980146380, Sep. 24, 2020.

Singer, D., Liquid Web, What is Single Tenant vs. Multi-Tenant Software? https://www.liquidweb.com/kb/what-is-single-tenant-vs-multi-tenant-software/#:~: text=Multi%2Dtenancy%20is%20the%20environment, Salesforce, Sep. 27, 2019.

* cited by examiner

CORRELATING DATA CENTER RESOURCES IN A MULTI-TENANT EXECUTION ENVIRONMENT USING MACHINE LEARNING TECHNIQUES

FIELD

The field relates generally to information processing systems, and more particularly to techniques for resource management in such systems.

BACKGROUND

For many enterprises and other organizations, significant footprints of physical and virtual infrastructure exist to support shared execution environments. By way of example, build and deployment activities commonly occur within a shared execution environment, wherein shared build agents can execute large numbers of workloads on behalf of developers. In such an example context, the developers can be viewed as the tenants and/or end-users of the shared environment. However, this type of shared and multi-tenant infrastructure can be difficult to monitor and to troubleshoot due to the ephemeral and distributed nature of the workloads executed therein. Also, tenants in a shared infrastructure may not follow best practices when designing workloads, and workload cost(s) can be abstracted from the tenants and passed to the group managing the shared resources. Moreover, conventional multi-tenant execution environment management techniques fail to dynamically detect misuse and/or misconfiguration of resources.

SUMMARY

Illustrative embodiments of the disclosure provide techniques for correlating data center resources in a multi-tenant execution environment using machine learning techniques. An exemplary computer-implemented method includes obtaining multiple data streams pertaining to one or more data center resources in at least one multi-tenant executing environment, and correlating one or more portions of the multiple data streams by processing at least a portion of the multiple data streams using at least one multi-tenant-capable search engine. The method also includes determining one or more anomalies within the multiple data streams by processing the one or more correlated portions of the multiple data streams using a machine learning-based anomaly detection engine, and performing at least one automated action based at least in part on the one or more determined anomalies.

Illustrative embodiments can provide significant advantages relative to conventional multi-tenant execution environment management techniques. For example, problems associated with failing to dynamically detect misuse and/or misconfiguration of resources are overcome in one or more embodiments through correlating data from multiple data streams from a multi-tenant executing environment and determining one or more anomalies therein using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
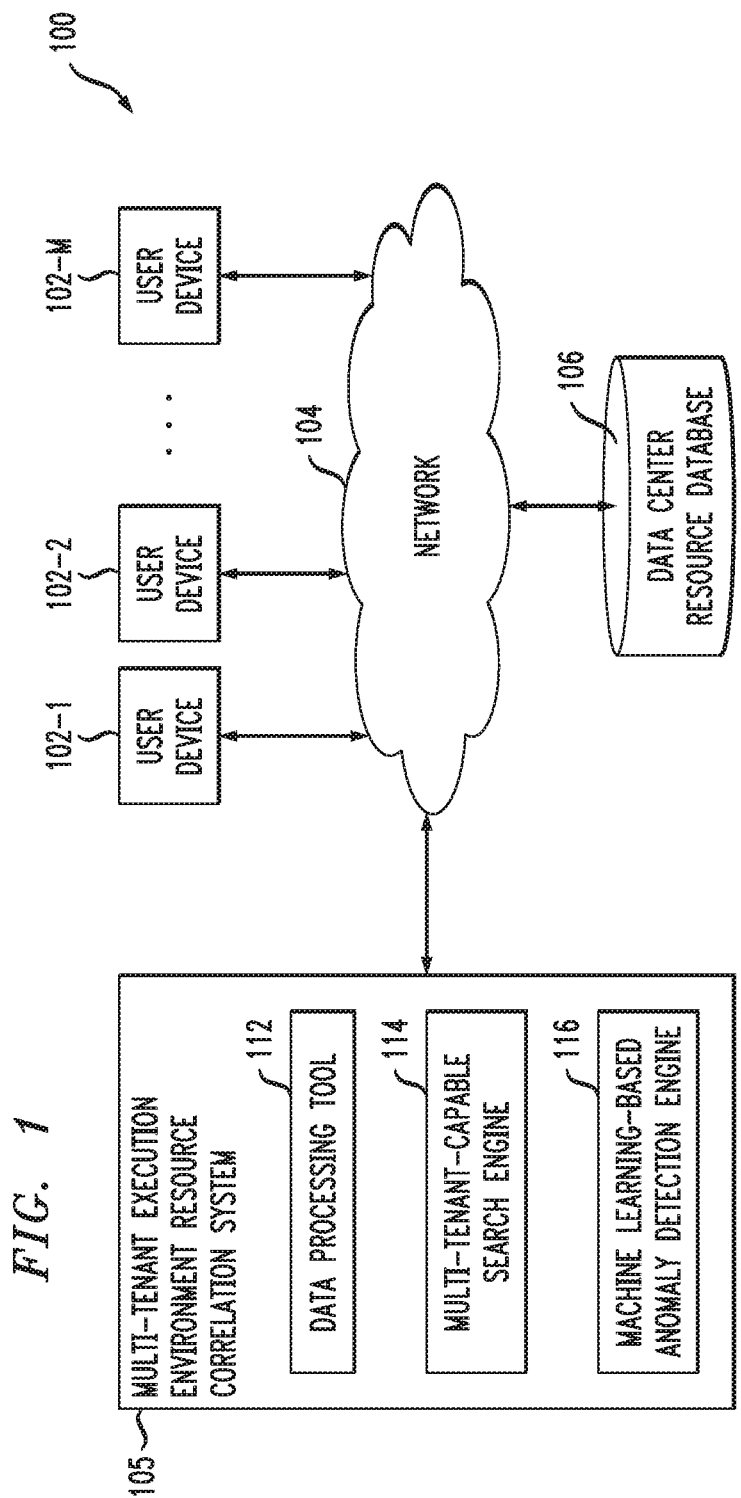
FIG. 1 shows an information processing system configured for correlating data center resources in a multi-tenant execution environment using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is multi-tenant execution environment resource correlation system 105.

The user devices 102 may comprise, for example, mobile telephones, laptop computers, tablet computers, desktop computers or other types of computing devices within one or more data centers. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. For example, in one or more embodiments, a "user" refers to a requester of a workload and/or a workload scheduling.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, multi-tenant execution environment resource correlation system 105 can have an associated database 106 configured to store data pertaining to data center resources, which comprise, for example, central processing unit (CPU) usage, memory usage, performance metrics, etc.

The data center resource database 106 in the present embodiment is implemented using one or more storage systems associated with multi-tenant execution environment resource correlation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with multi-tenant execution environment resource correlation system 105 are one or more input-output devices, which illustratively comprise keyboards, displays or other types of input-output devices in any combination. Such input-output devices can be used, for example, to support one or more user interfaces to multi-tenant execution environment resource correlation system 105, as well as to support communication between multi-tenant execution environment resource correlation system 105 and other related systems and devices not explicitly shown.

Additionally, the multi-tenant execution environment resource correlation system 105 in the FIG. 1 embodiment is assumed to be implemented using at least one processing device. Each such processing device generally comprises at least one processor and an associated memory, and implements one or more functional modules for controlling certain features of multi-tenant execution environment resource correlation system 105.

More particularly, multi-tenant execution environment resource correlation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows multi-tenant execution environment resource correlation system 105 to communicate over the network 104 with the user devices 102, and illustratively comprises one or more conventional transceivers.

The multi-tenant execution environment resource correlation system 105 further comprises a data processing tool 112, a multi-tenant-capable search engine 114, and machine learning-based anomaly detecting engine 116.

It is to be appreciated that this particular arrangement of modules 112, 114 and 116 illustrated in the multi-tenant execution environment resource correlation system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for correlating data center resources in a multi-tenant execution environment using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, multi-tenant execution environment resource correlation system 105 and data center resource database 106 can be on and/or part of the same processing platform.

An exemplary process utilizing modules 112, 114 and 116 of an example multi-tenant execution environment resource correlation system 105 in computer network 100 will be described in more detail with reference to the flow diagram of FIG. 9.

Accordingly, at least one embodiment includes correlating data center resources in a multi-tenant execution environment using machine learning techniques. As detailed herein, such an embodiment can include using monitoring and logging solutions in combination to achieve advanced visibility into a multi-tenant environment. Such an embodiment further includes classifying workloads based at least in part on tenant activity (e.g., by grouping tenants performing similar work into one or more categories), and profiling tenant workload performance in connection with such classifications (e.g., by measuring the performance of tenant workloads inside one or more classification categories to provide optimization feedback). Additionally or alternatively, one or more embodiments include providing show-back and charge-back costing of binaries and libraries used by tenants (e.g., by determining and/or displaying the overall organizational cost of workloads), and providing advanced troubleshooting data through workload classification (e.g., by using analytics to identify problem areas through workload classification).

As used herein, providing "show-back" costing refers to displaying the total cost of one or more endeavors back to a user, and providing "charge-back" costing refers to billing that same total cost to the user, through internal billing and/or budget tools, a charge and/or sale, etc. Additionally, example binaries or libraries, as used in connection with one or more embodiments, might include components such as Apache Web server, Java, Tomcat, etc., wherein such components make up part of a processing solution and have individual versions. By way merely of illustration, an example embodiment can include showing costs of users leveraging one such binary component versus one or more other such binary components, and/or differences in versions of a particular binary (e.g., determining whether CPU utilization increases when an Apache Web server binary was updated from version 1.0 to 2.0).

As also detailed herein, one or more example embodiments are described within a context of build and deployment systems, but it is to be appreciated that one or more embodiments are applicable to many multi-tenant platforms wherein workloads are executed on at least one shared infrastructure (e.g., multi-tenant Containers as a Service (CaaS) systems, Kubernetes clusters run by a central information technology organization, etc.).

As used herein, a workload distribution system refers to a workload scheduler and/or job scheduler that procures shared infrastructure on behalf of at least one user. As used herein, a "tenant" refers to an end-user that is sharing a resource and/or a capability with one or more other tenants with similar needs, but wherein each such tenant operates in an isolated and/or individual manner. Such a configuration and/or environment allows, for example, for more efficient consumption and management of a shared resource, which can be presented as-a-Service rather than being owned or operated by the tenant. Such a system (e.g., a build system, a CaaS system, an Infrastructure as a Service (IaaS) system, etc.) can be used, for example, to optimize infrastructure utilization across a large number of users. As also used herein, a workload refers to an executable job with a finite lifetime (e.g., a bash script, a dynamic application server node, an automated web browser, etc.), trace logs refer to information output from a running workload to known system file locations (e.g., system logging protocol (syslog), standard output (stdout), etc.), and metrics refer to profiling information collected on infrastructure on a regular cadence (e.g., CPU usage per 60 second intervals, etc.).

At least one embodiment includes optimizing shared data center resources in a containerized and/or Platform-as-a-Service (PaaS) environment. Such an embodiment includes processing machine and workload logs along with related data for profiling and classifying the workloads. This correlation between tenants and data center(s) facilitate dynamic identification of anomalies and/or failures in the environment.

As further detailed herein, one or more embodiments include monitoring data center resources. Virtual or physical machines can be monitored, for example, externally by a hosting platform and/or internally by a performance monitoring agent. Such monitoring can provide real-time visibility into the CPU, memory, storage, services status, and/or other data points. Similarly, further insight can be gained by utilizing one or more log aggregation tools and/or services.

In one or more embodiments, log aggregation tools and/or services can monitor file and/or event streams on a machine and forward such streams back to a centralized processing server, whereby advanced analysis can be optionally performed. Such an embodiment includes facilitating the determination of further insights wherein specific workload errors can be identified and/or other performance and utilization metrics can be measured.

Additionally or alternatively, in at least one embodiment, one or more dashboards are used to project data using information such as, for example, statistical graphs and charts. Such dashboards may include details about the number of workloads, the total workloads running versus the total failed workloads, a percentage ratio for the same, etc. Such dashboards can also include details pertaining to CPU, memory, storage, services status, and/or other data for a given machine or a set of machines. Also, in one or more embodiments, alerts can be generated and output in connection with one or more dashboards upon meeting one or more pre-determined data-based conditions. For example, alerts can be generated and output when the percentage ratio of total workloads running versus total failed workloads crosses a given threshold, and/or when individual infrastructure resources such as CPU, memory, etc., become overutilized beyond a given threshold.

Further, at least one embodiment includes classifying and profiling of workloads based at least in part on the given toolset and dependencies related thereto, and using such classifying and profiling to identify anomalies and/or best practices for such workloads. Additionally or alternatively, at least one embodiment includes determining infrastructure-based errors in an execution environment and corresponding dependencies, and using such determinations to identify anomalies and/or failures for a given tool or dependency.

Figure 2:
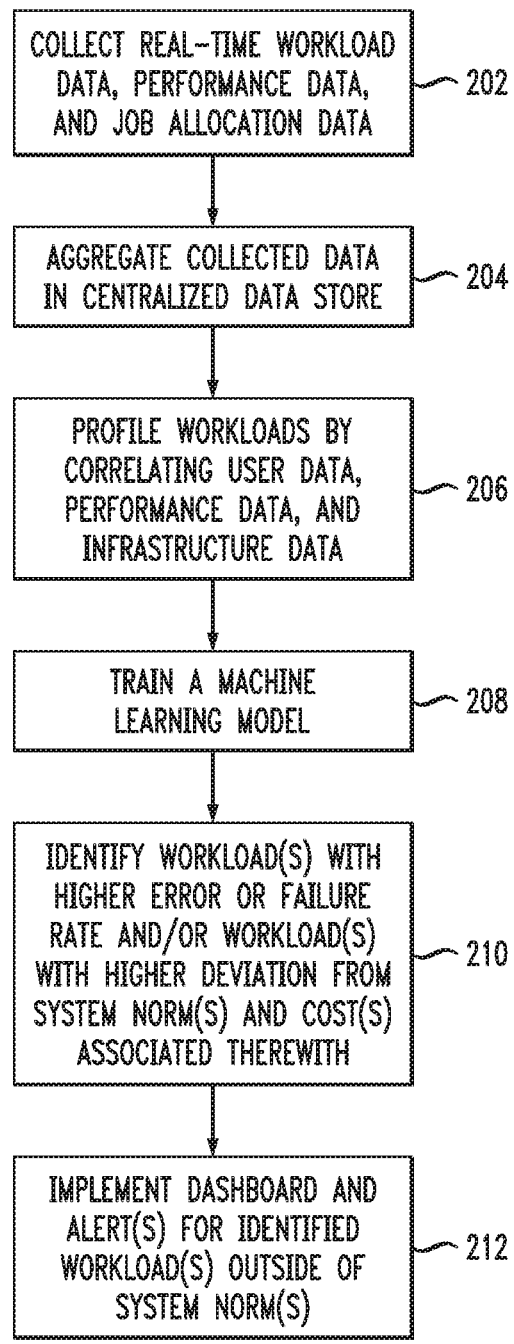
FIG. 2 shows a flow diagram of a process for correlating data center resources in a multi-tenant execution environment using machine learning techniques in an illustrative embodiment.

FIG. 2 shows a flow diagram of a process for correlating data center resources in a multi-tenant execution environment using machine learning techniques in an illustrative embodiment. As depicted in FIG. 2, step 202 includes collecting real-time workload data, performance data, and job allocation data with respect to at least one multi-tenant execution environment. Step 204 includes aggregating the collected data in at least one centralized data store, and step 206 includes profiling such workloads by correlating user data, performance data, and infrastructure data. Step 208 includes training at least one machine learning model, while step 210 includes identifying, using the trained machine learning model, one or more workloads with a higher error or failure rate from system norms and/or one or more workloads with higher deviation from system norms, and cost(s) associated therewith. Further, as depicted in FIG. 2, step 212 includes implementing at least one dashboard and alert(s) in connection with the dynamically identified workload(s) outside of system norm(s).

With respect to machine learning models (such as detailed, for example, in connection with step 208 above), one or more embodiments include using shallow learning techniques and deep learning techniques. Using a shallow learning technique, an example embodiment can include utilizing principal component analysis (PCA) to reduce dimensionality and determine which parameter(s) is/are important for training. After the PCA is completed, such an embodiment can include utilizing a multivariate anomaly detection algorithm using at least one distance classifier (e.g., a Mahalanobis distance classifier). Additionally or alternatively, in a complex data center context, at least one embodiment includes using one or more deep learning techniques for anomaly detection. Using one or more deep learning techniques, such an embodiment can include leveraging an artificial neural network (ANN) (e.g., an autoencoder).

Figure 3:
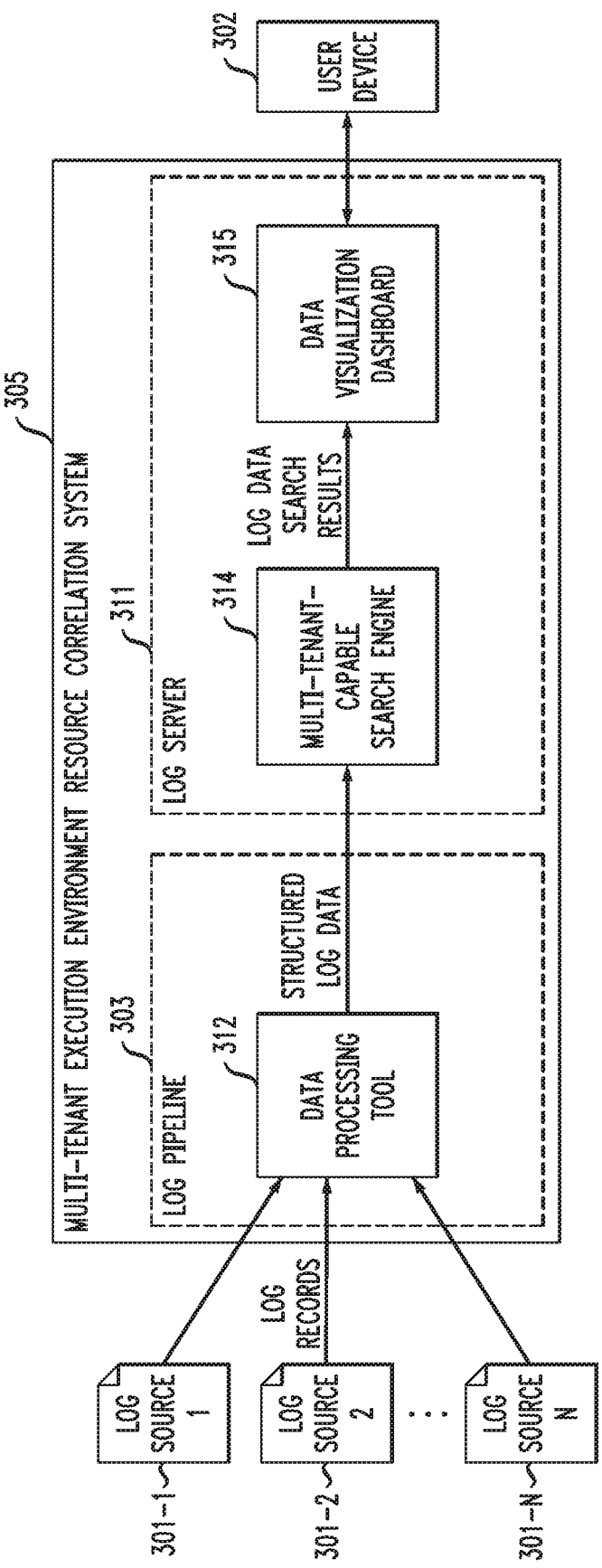
FIG. 3 shows collection of trace log data in an illustrative embodiment.

FIG. 3 shows collection of trace log data in an illustrative embodiment. In the example embodiment depicted in FIG. 3, data are collected from data center log source steams 301-1, 301-2, and 301-N. The data center logs and related data can be collected and pushed using a data processing tool (e.g., Logstash) 312 within a log pipeline 303 (within multi-tenant execution environment resource correlation system 305), wherein the data processing tool 312 collects, filters, and transforms the data center logs and related data. By way of example, many logs can typically be verbose, and as such, in one or more embodiments, filters and/or transforms can be applied to logs at intake to render the logs more manageable for further processing. For instance, date-time stamps can be extracted from such logs and/or processing based on keywords in such logs can be performed. Additionally or alternatively, logs can be converted from a string format to a searchable database JavaScript object notation (j son) with one or more appropriate filters and/or transforms to render the logs more compatible with one or more automated solutions.

By way of example, in one or more embodiments, workload data and/or jobs data can be output in two streams of structured data logs, one of which includes high-level workload and/or job details and tags, while the other includes more detailed runtime and/or machine logs and data. Such structured data logs can then be provided to log server 311, and more particularly, to a multi-tenant capable search engine 314 (e.g., Elasticsearch) within log server 311 (within multi-tenant execution environment resource correlation system 305). As used herein, a log server refers to a database capable of storing, filtering, and transforming logs for search optimization. As also used herein, a multi-tenant capable search engine refers to a database and/or database management system capable of performing cross-table and/or cross-index queries and fulfilling requirements of machine learning system correlation needs.

Using the structured data log output(s), at least one embodiment includes storing, indexing, and searching one or more data sources via the multi-tenant-capable search engine 314, and generating log data search results that are provided to and/or processed by a data visualization dashboard 315 (e.g., Kibana). The data visualization dashboard 315 can use the search results to, for example, generate one or more queries, one or more reports, one or more alerts, and/or one or more visualizations, at least a portion of which can be output to user device 302.

As illustrated, FIG. 3 depicts one or more aspects of an example embodiment pertaining to a double-click and/or deep dive into the structure of log collection, such as further detailed in connection with FIG. 5 (e.g., the flow of data from component 503-1 to component 506 to component 514). As also noted above and depicted, FIG. 3 illustrates the visualization capability included in one or more embodiments.

Figure 4:
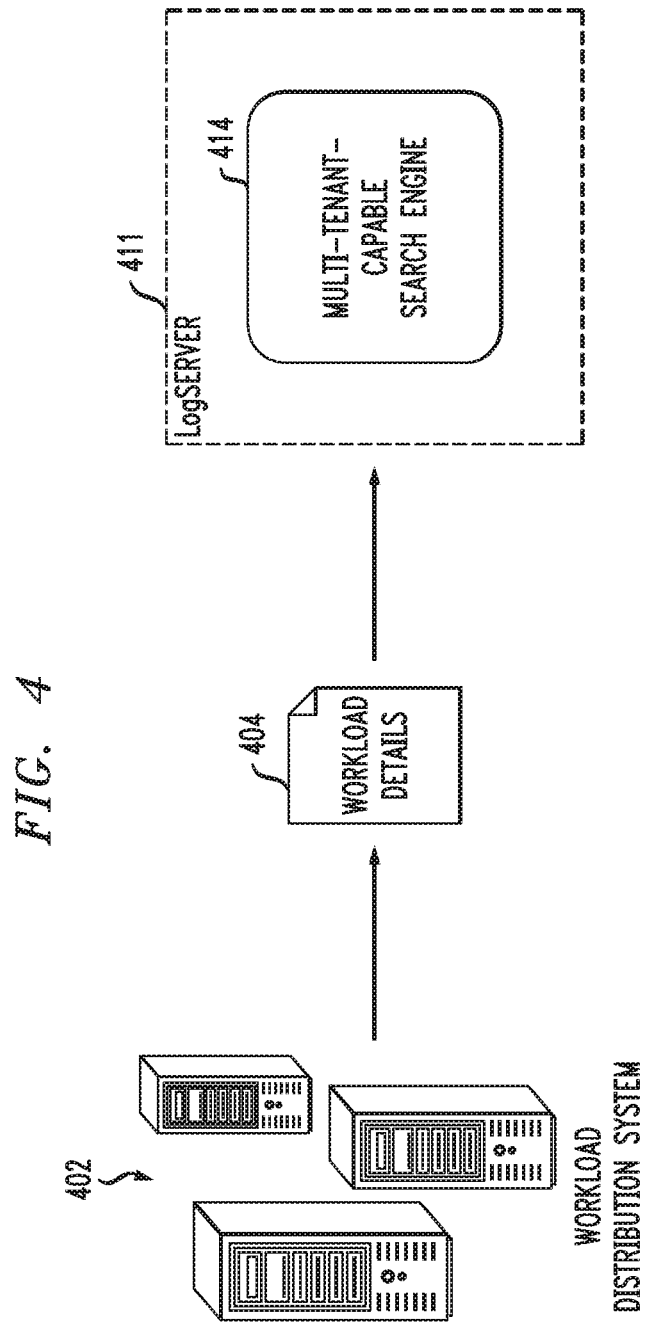
FIG. 4 shows collection of tenant workload data in an illustrative embodiment.

FIG. 4 shows collection of tenant workload data in an illustrative embodiment. By way of illustration, FIG. 4 depicts a workload distribution system 402, which generates workload details 404 which are processed by multi-tenant-capable search engine 414 within log server 411. Such an embodiment includes generating and/or pulling workload data 404 that can include job data as well as point-in-time snapshots of log and performance data. Similar to FIG. 3, FIG. 4 depicts one or more aspects of an example embodiment pertaining to a double-click and/or deep dive into the structure of log collection, such as further detailed in connection with FIG. 5 (e.g., the flow of data from component 502 to component 504 to component 514).

In such an embodiment, correlating data from multiple sources can include using significant terms mapping (e.g., job data can have the machine name in its data, which can be used to properly pull trace logs from the logging system and performance data from the performance system), and/or explicit addition of a unique label to such records.

Figure 5:
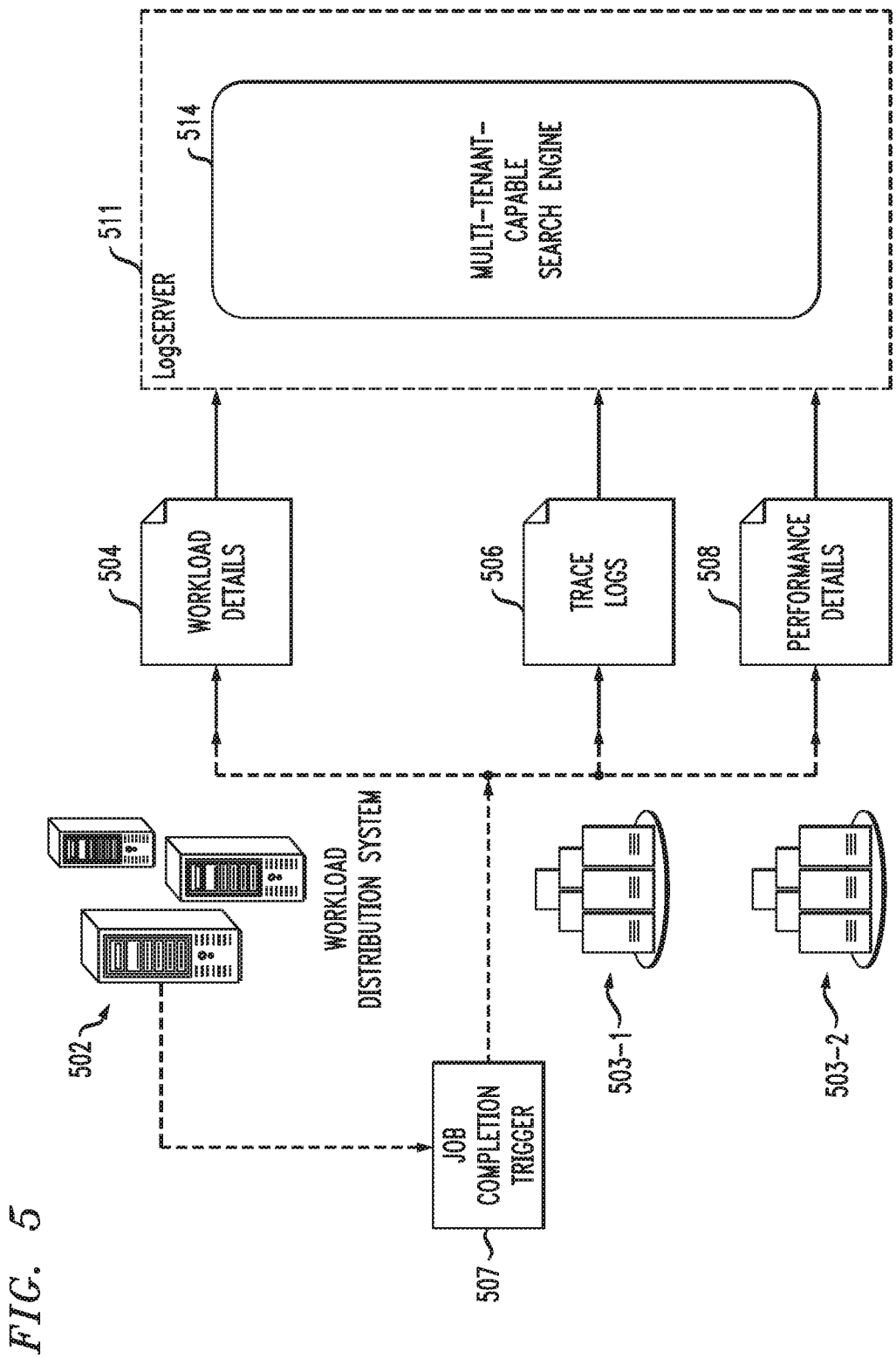
FIG. 5 shows collection of monitoring, logging, and workload data via automation in an illustrative embodiment.

FIG. 5 shows collection of monitoring, logging, and workload data via automation in an illustrative embodiment. By way of illustration, component 502 represents a workload distribution system responsible for interfacing with tenants, collecting tenant input, and organizing workflows across distributed multi-tenant computing systems 503-1 and 503-2. Also, job completion trigger 507 represents an event hook that is part of an operational workflow for workload distribution system 502. By way of example, when tenant jobs are completed, workload distribution system 502 fires an automated event that triggers tagging and/or correlation of multi-source data (e.g., data 504, 506, and/or 508, as further detailed below) via job completion trigger 507. Such action(s) can be carried out, for example, by contacting multi-tenant-capable search engine 514 and creating a correlation record between point-in-time data represented in streams 504, 506 and 508 that ties such data together in a searchable way that relates back to the tenant(s) and job-specific information.

As noted above and also depicted in FIG. 5, workload details 504, trace logs 506, and performance details 508 represent different sources of performance, log and/or event data sourced by distributed multi-tenant computing system 503-1 and/or distributed multi-tenant computing system 503-2, as well as by workload distribution system 502. As additionally depicted in FIG. 5 and described herein, log server 511 represents a hosting environment for multi-tenant-capable search engine 514, and can include a server, a cluster, a cloud, etc. Further, as detailed herein, multi-tenant-capable search engine 514 can include a database and/or database management system capable of carrying out cross-table and/or cross-index queries and fulfilling requirements of machine learning-based system correlation needs.

Figure 6:
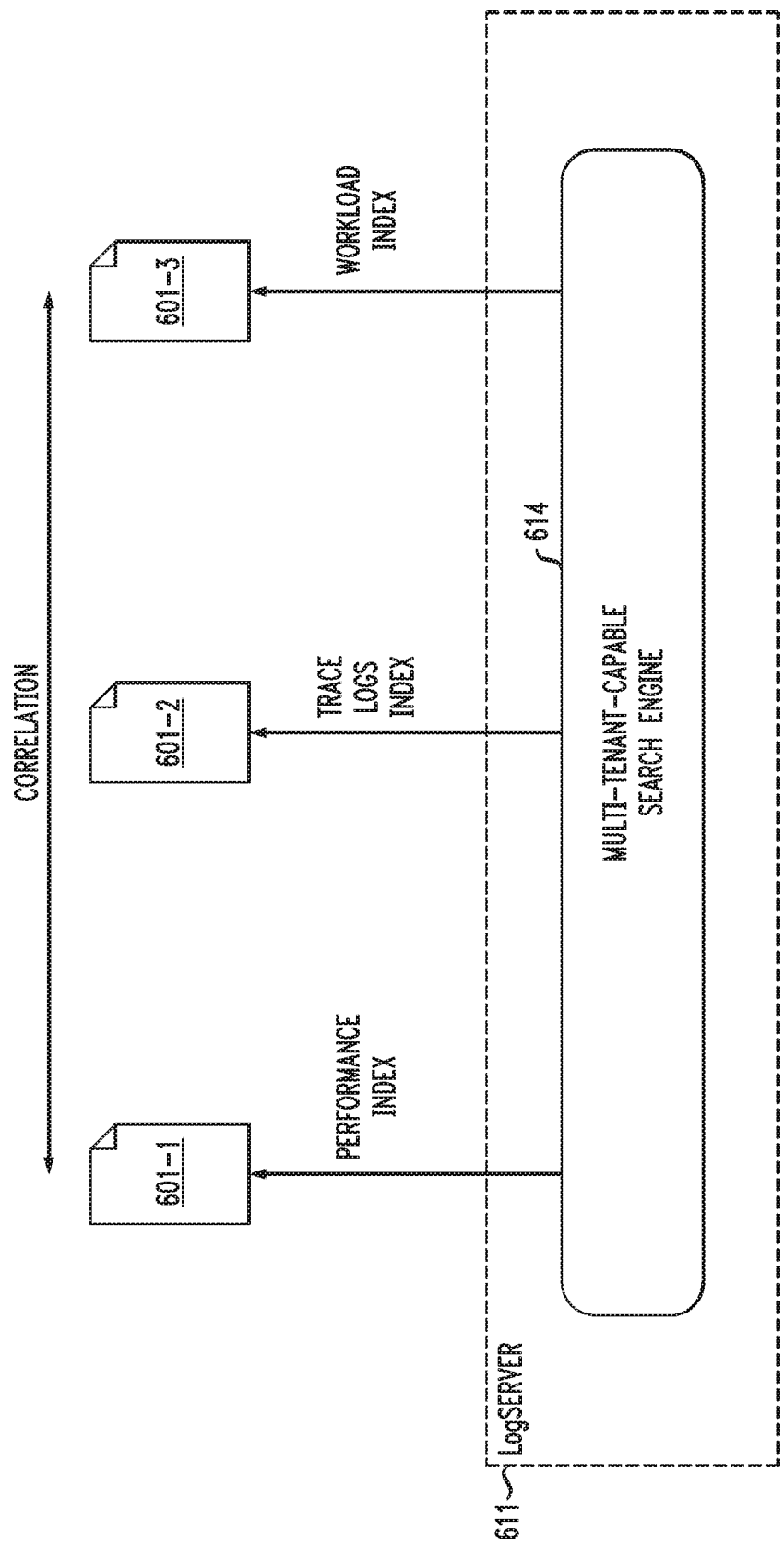
FIG. 6 shows correlation of monitoring, logging, and workload data via automation in an illustrative embodiment.

FIG. 6 shows correlation of monitoring, logging, and workload data via automation in an illustrative embodiment. By way of illustration, FIG. 6 depicts multi-tenant-capable search engine 614 (within log server 611), which produces and/or outputs data streams 601-1 (pertaining to at least one performance index), 601-2 (pertaining to at least one trace logs index), and 601-3 (pertaining to at least one workload index). By way of example, a performance index (e.g., 601-1) can include information such as CPU usage, RAM usage, storage usage, etc. Also, a trace log index (e.g., 601-2) can include information such as binaries and/or libraries used, success and/or failure codes, error messages, external dependencies referenced, etc. Further, a workload index (e.g., 601-3) can include information such as tenant identification(s), workload identifier(s), targeted agent(s), etc. In an example embodiment such as depicted in FIG. 6, a correlation among multiple streams of data (e.g., 601-1, 601-2, and 601-3) can be established using at least a portion of these specific fields and/or information in each stream.

As detailed herein, one or more embodiments include utilizing multiple categories of datasets involved in a multi-tenant distributed environment. Such categories can include, for example, job-related data and/or process-related data from the workload distribution system, infrastructure performance data from at least one performance system, and workload and/or application trace logs (e.g., syslogs). Such categories of data can be queried in a centralized data repository (e.g., via a multi-tenant-capable search engine), and analyzing and identifying issues in such data can be carried out, in at least one embodiment, using machine learning techniques, statistical analysis, and/or one or more neural networks for autocorrelation, anomaly detection and prediction functionalities.

Additionally, one or more embodiments include preprocessing such obtained data for feature selection before identifying at least one correlation between various parameters. Feature selection, in such an embodiment, includes a process of selecting the one or more attributes and/or one or more parameters that can make the anomaly prediction attribute more accurate, and identifying the one or more attributes and/or one or more parameters that are not relevant or can decrease accuracy. Feature correlation identifies one or more relationships between multiple variables and attributes in the dataset, and can also indicate the presence of one or more causal relationships. For example, if a security scan fails, multiple jobs that depend on the security scan will likely fail. In at least one embodiment, a feature selection step also identifies positive and negative correlation between parameters such as, for example, determining whether an increase in CPU utilization increases (i.e., a positive correlation) or decreases (i.e., a negative correlation) memory utilization. By measuring such behaviors and relationships, an anomaly detection engine can predict when a given state is normal and when the state is anomalous.

Figure 7:
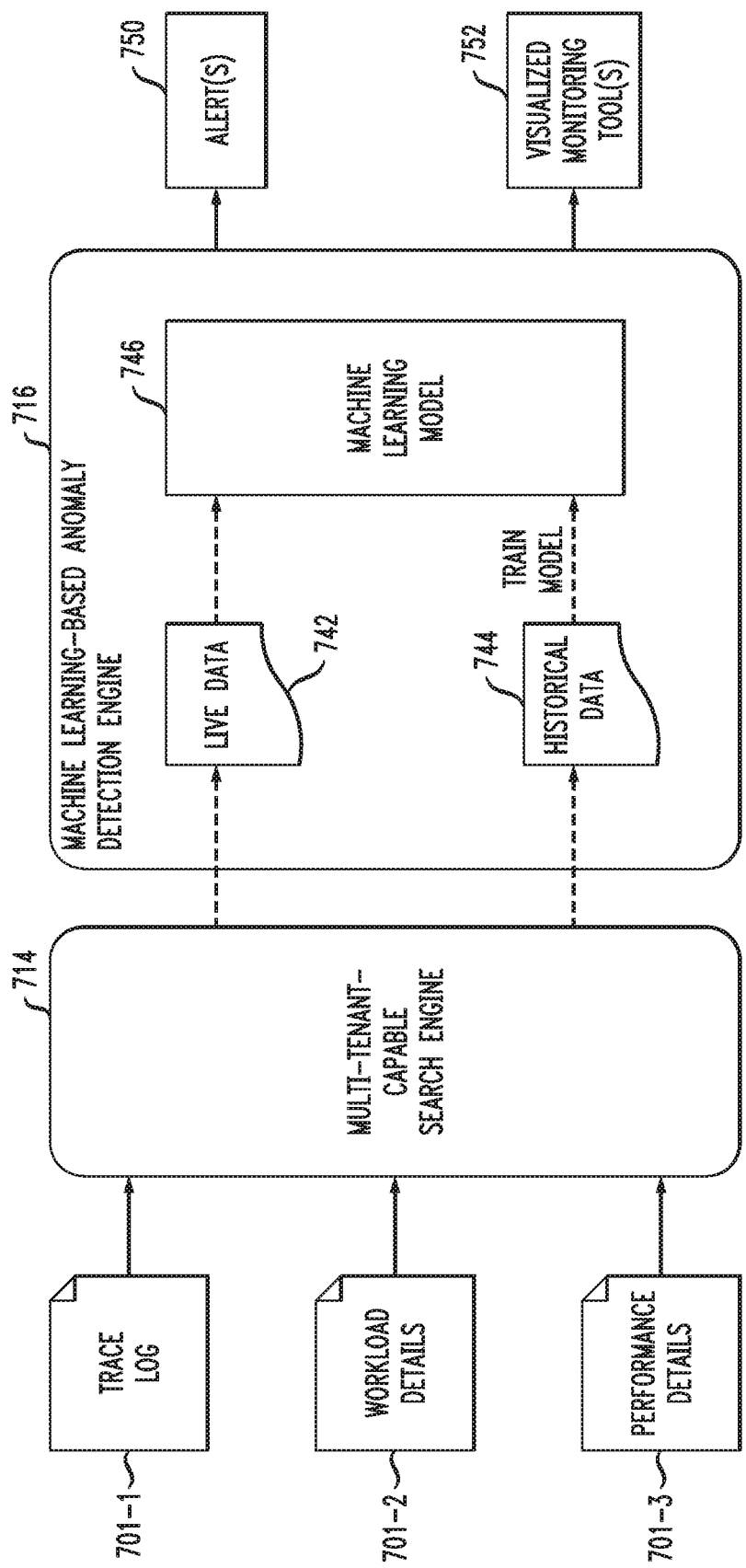
FIG. 7 shows architecture for an example anomaly detection engine in an illustrative embodiment.

FIG. 7 shows architecture for an example anomaly detection engine in an illustrative embodiment. By way of illustration, FIG. 7 depicts data streams 701-1 (pertaining to trace log data), 701-2 (pertaining to workload details), and 701-3 (pertaining to performance details), which are processed by multi-tenant-capable search engine 714. The output of the multi-tenant-capable search engine 714 is provided to machine learning-based anomaly detection engine 716, which includes a machine learning model 746 (e.g., an ANN autoencoder). In at least one embodiment, the output of the multi-tenant-capable search engine 714 includes data that fall under multiple categories (e.g., infrastructure related data, application behavior data, and/or log data that include information and error logs for each component). Some of such data can include information pertaining to CPU utilization, memory utilization, input-output (IO), hard disk utilization, error and information logs of components, etc. Additionally, such output data are used to train machine learning model 746.

As also depicted in FIG. 7, the machine learning model 746 is trained using historical data 744 (e.g., because, in one or more embodiments, data collection is continuous, historical data can be considered any previous data from anywhere before the last, for example, 24 hours), and is implemented to detect one or more anomalies in live data 742 (e.g., data from within the previous few minutes and/or hours up to a given limitation such as 24 hours). Based at least in part on the one or more detected anomalies, the machine learning-based anomaly detection engine 716 generates and/or outputs one or more alert(s) 750 and one or more visualized monitoring tools 752. By way merely of example, such visualized monitoring tools can include Kibana, Grafana, etc., and example alerts might include notifications such as "High CPU," "High failure rate in jobs using Java binaries," etc. Alerts can be output via various channels (e.g., email, text message, etc.) and/or to another automation system which can provide automated remediation (e.g., removing nodes or data centers from a distributed system in the case of high failure rates).

In one or more example embodiments implemented in data center contexts, the dimensions of data can be complex and mostly non-linear in nature. For example, relationships between CPU utilization, memory utilization, and IO blocking threads, etc. may not be linear. Some processes are CPU-intensive whereas other processes are more IO-intensive, so such parameters may have a complex, non-linear correlation. In such a scenario, at least one embodiment includes using a deep learning algorithm (for example, as the machine learning model 746 in machine learning-based anomaly detection engine 716). In other contexts (e.g., scenarios wherein the dimensions of the data are linear in nature) and/or one or more other embodiments, at least one shallow learning algorithm using PCA and a direction-sensitive distance classifier can be implemented.

Accordingly, at least one embodiment includes performing feature selection and feature correlation using a dimension reduction algorithm such as PCA, which determines patterns and correlations among various features in at least one dataset and then reduces the dimensionality of the at least one dataset while keeping the features intact. In such an embodiment, PCA can also perform a mapping of the data to a lower-dimensional space in such a way that the variance of the data in the low-dimension space is maximized. A covariance matrix of the data can be constructed, and eigenvectors of the matrix can be computed. The eigenvectors that correspond to the largest eigenvalues (that is, the principal component(s)) are used to construct the variance of the original data. With this process, the original feature space is reduced, while retaining the most important variance(s).

Additionally or alternatively, one or more embodiments include multivariate anomaly detection using at least one distance classifier algorithm. In an example of such an embodiment, after a PCA process is completed, a multivariate statistical algorithm can be used for anomaly detection. By way of illustration, in a given collection of data points, there is commonly a certain distribution. For example, one type of distribution is referred to as a Gaussian distribution. To detect anomalies in a more quantitative way, a probability distribution (P(X)) from the data points can be calculated. In such an embodiment, when a new value of X is obtained, a distance classifier algorithm compares P(X) with a threshold R. If, typically, P(X)>R, but in this instance P(X)<R, then such an instance is considered to be indicative of an anomaly.

An approach of using a normal distribution and a standard deviation from the center of mass does not always work in instances wherein the sample points are distributed in a non-spherical manner. In such a scenario, at least one embodiment includes using a Mahalanobis distance (MD) measure by calculating the distance between two points (for example, a performance data point and an error data point), correlated or not, in a multi-variate space. The formula for calculating a Mahalanobis distance is as follows:

$$d(\text{Mahalanobis}) = [(x_B - x_A)^T * C^{-1} * (x_B - x_A)]^{0.5}$$

wherein $x_A$ and $x_B$ represent a pair of objects, C represents the sample covariance matrix, and T represents an indicator that the vector of $(x_B-x_A)$ needs to be transposed. Data containing normal behavior can be used to train the model and calculate the covariance matrix. During testing and/or in real situations, sample data will be fed to the model to compute the Mahalanobis distance to the normal situation and classify the situation as an anomaly if the distance between a normal point and a sample point is beyond a certain threshold.

By way of example, such techniques can be implemented in accordance with one or more embodiments as a shallow learning algorithm using, for instance, Python, ScikitLearn, Pandas and NumPy libraries. In such an embodiment, the covariance matrix is calculated, which can then be input into the computation of a Mahalanobis distance. An outlier detection function can then be implemented by comparing the computed Mahalanobis distance with a threshold value.

Additionally or alternatively, one or more embodiments include multivariate anomaly detection using an ANN). Such an embodiment may be better suited, for example, for complex non-linear data sets in performance, process and error logging domains. As also detailed herein, such an embodiment can include using an autoencoder network to learn efficient data coding and/or feature learning in an unsupervised manner. A goal of autoencoder can be to learn a representation and/or feature (encoding) for a set of data, typically for dimensionality reduction. Along with the reduction side, a reconstructing side can be determined wherein the autoencoder attempts to generate, from the reduced encoding, a representation as close as possible to an original input. For example, an autoencoder can input data parameters such as performance data as well as jobs data and process behavior data, and by performing encoding and decoding, the autoencoder learns at least one correlation between the parameters.

Figure 8:
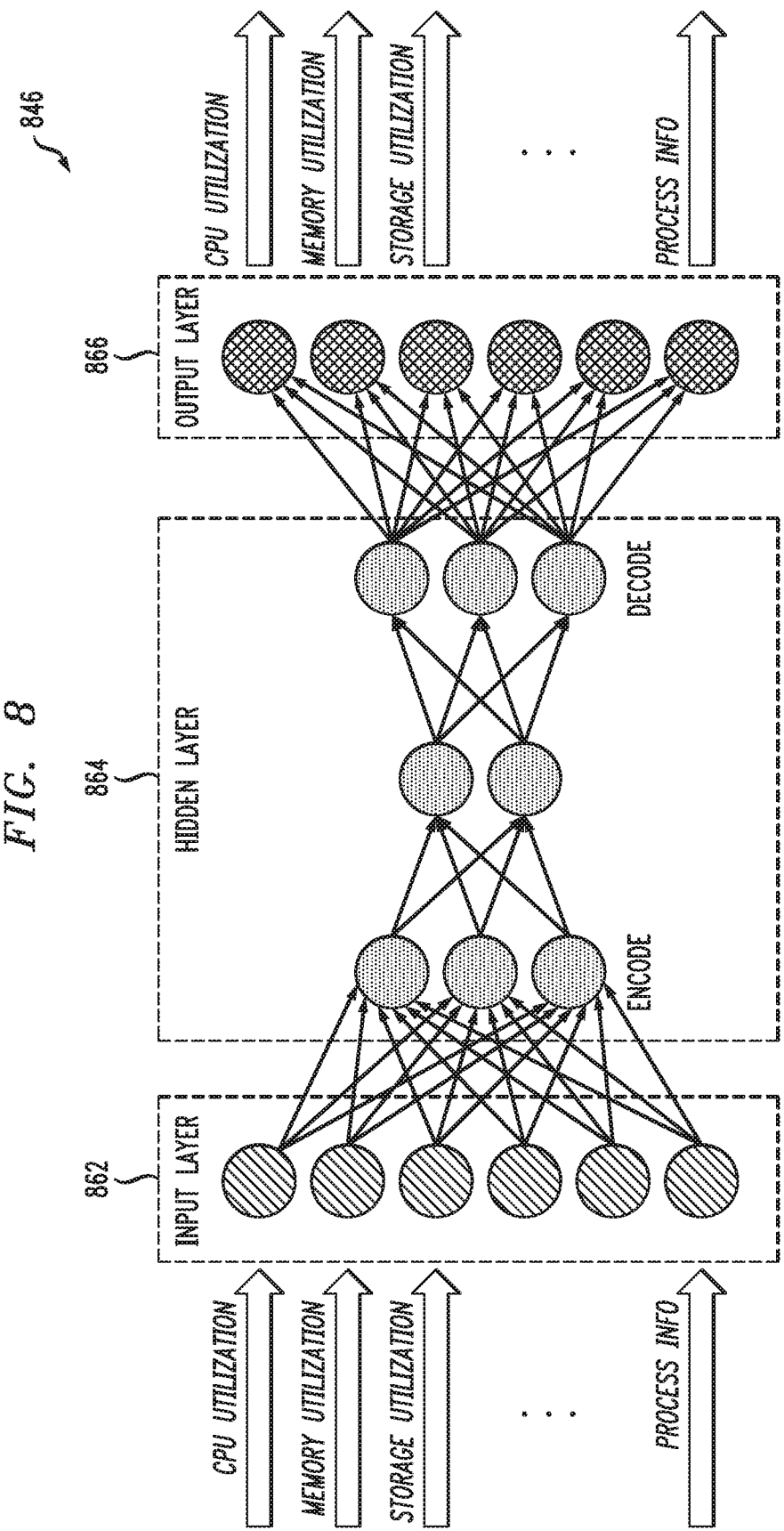
FIG. 8 shows architecture for an example artificial neural network in an illustrative embodiment.

FIG. 8 shows architecture for an example artificial neural network in an illustrative embodiment. Specifically, FIG. 8 depicts an example autoencoder 846, which is a form of a feed-forward neural network also referred to as an ANN or a Multi-Layer Perceptron (MLP). As illustrated in the example in FIG. 8, autoencoder 846 includes an input layer 862, an output layer 866, and one or more hidden layers 864 therebetween. In one or more embodiments, the output layer 866 will have the same number of nodes (for example 10-12 nodes) as the input layer 862.

In the context of anomaly detection, autoencoder 846 compresses input data (e.g., performance data, process and application behavior logs, etc.) to a lower dimensional representation, which will capture one or more correlations and interactions between various variables and parameters. Autoencoder 846 can then be trained using data from at least one normal operating state of the system(s) in the given data center, which includes compressing and reconstructing one or more input variables. During the dimensionality reduction, autoencoder 846 learns one or more interactions between various variables and reconstructs portions of data back to the original variables at the output.

As the performance of a distributed environment such as a data center degrades, the degradation can affect the interaction between variables (e.g., a change in CPU utilization, memory utilization, a number of 10 blocking instances, etc.). As this happens, the number of errors tend to increase in the reconstruction of the networks input variables. By utilizing a probability distribution of the reconstruction error, at least one embodiment (e.g., via autoencoder 846) includes identifying if a sample data point (e.g., the state of CPU, memory, IO, process behavior, etc.) is normal or anomalous. Based on such a decision from a machine learning model, anomalous behaviors can be alerted to an operations entity for corrective action and/or automatically remedied and/or mitigated.

Additionally or alternatively, in connection with implementing an autoencoder, in one or more embodiments, a mean squared error can be used as a loss function, and Adam, an adaptive optimized algorithm, can be utilized for stochastic optimization. Such algorithms can be changed as part of a hyper-parameter search and tuning exercise to reach improved model performance and accuracy.

By way of illustration, as noted herein, an example use case for implementing one or more embodiments can include a build and deployment system. In an example build and deployment system, thousands of automation jobs can be requested by source control and automation system users each day, and such jobs are hosted on shared infrastructure managed by a centralized operations entity. Workload requests, or jobs, are provided in document form, with execution scripts and execution environment requirements (e.g., a container image or virtual machine prerequisites) attached. A backend workload scheduling system procures matching infrastructure and executes the workload via at least one agent. In such an example, the source control and automation system ecosystem can exist across multiple different data centers and user workloads can connect to thousands of upstream and downstream dependencies. As such, in such an example use case, one or more embodiments can include categorizing and identifying tenant workloads via at least one binary executable file, identifying one or more specific failures based on workload categorization, and profiling tenant performance based on workload categorization.

Figure 9:
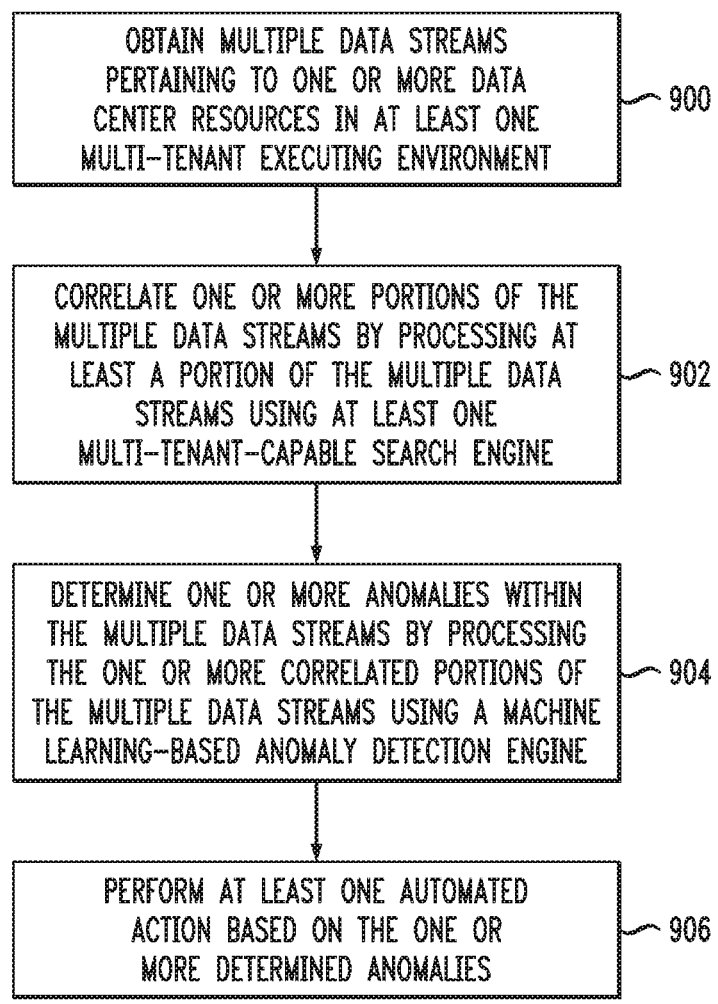
FIG. 9 is a flow diagram of a process for correlating data center resources in a multi-tenant execution environment using machine learning techniques in an illustrative embodiment.

FIG. 9 is a flow diagram of a process for correlating data center resources in a multi-tenant execution environment using machine learning techniques in an illustrative embodiment. It is to be understood that this particular process is only an example, and additional or alternative processes can be carried out in other embodiments.

In this embodiment, the process includes steps 900 through 906. These steps are assumed to be performed by multi-tenant execution environment resource correlation system 105 utilizing its modules 112, 114 and 116.

Step 900 includes obtaining multiple data streams pertaining to one or more data center resources in at least one multi-tenant executing environment. In at least one embodiment, the multiple data streams include at least one of one or more data streams pertaining to performance data, one or more data streams pertaining to job allocation data, one or more data streams pertaining to trace log data, and one or more data streams pertaining to workload data.

Step 902 includes correlating one or more portions of the multiple data streams by processing at least a portion of the multiple data streams using at least one multi-tenant-capable search engine. In at least one embodiment, correlating the one or more portions of the multiple data streams includes classifying workloads associated with the one or more portions of the multiple data streams based at least in part on tenant activity. In such an embodiment, correlating can also include profiling performance of the workloads based at least in part on said classifying.

Step 904 includes determining one or more anomalies within the multiple data streams by processing the one or more correlated portions of the multiple data streams using a machine learning-based anomaly detection engine. In at least one embodiment, processing the one or more correlated portions of the multiple data streams using the machine learning-based anomaly detection engine includes processing the one or more correlated portions of the multiple data streams using an artificial neural network. In such an embodiment, the artificial neural network includes an autoencoder comprising an input layer containing one or more nodes, an output layer containing one or more nodes, and at least one hidden layer configured to learn at least one feature in the one or more correlated portions of the multiple data streams. Further, in such an embodiment, using the autoencoder can include using a mean squared error as a loss function and/or using an Adam optimization algorithm for stochastic optimization.

Additionally or alternatively, in one or more embodiments, processing the one or more correlated portions of the multiple data streams using the machine learning-based anomaly detection engine includes using principal component analysis and at least one direction-sensitive di stance classifier algorithm.

Step 906 includes performing at least one automated action based at least in part on the one or more determined anomalies. In at least one embodiment, performing the at least one automated action includes mitigating at least a portion of the one or more determined anomalies and/or outputting one or more alerts to at least one operations entity.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to correlate data from multiple data streams from a multi-tenant executing environment and determine one or more anomalies therein using machine learning techniques. These and other embodiments can effectively overcome problems associated with failing to dynamically detect misuse and/or misconfiguration of resources in a multi-tenant executing environment.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
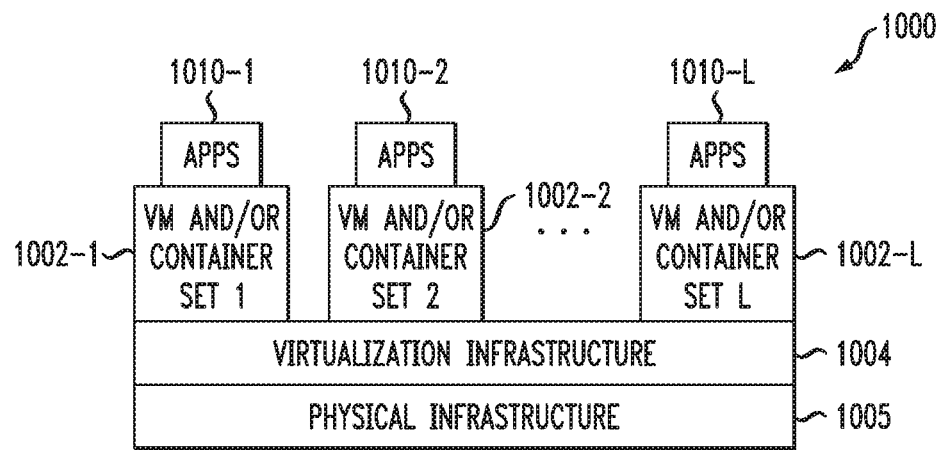
FIGS. 10 and 11 show examples of processing platforms that may be utilized to implement at least a portion of an information processing system in illustrative embodiments.
Figure 11:
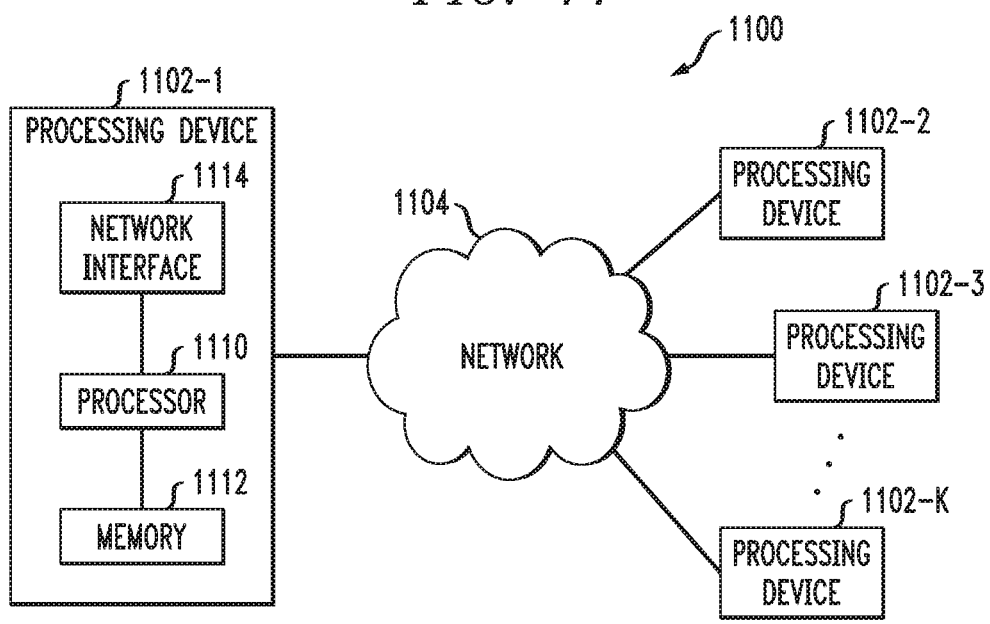

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an application-specific integrated circuit (ASIC), a field-programmable gate array (FPGA) or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining multiple data streams pertaining to one or more data center resources in at least one multi-tenant executing environment;

correlating one or more portions of the multiple data streams by processing at least a portion of the multiple data streams using at least one multi-tenant-capable search engine comprising at least one database capable of processing at least one of one or more cross-table queries and one or more cross-index queries;

determining one or more anomalies within the multiple data streams by processing the one or more correlated portions of the multiple data streams using a machine learning-based anomaly detection engine; and performing at least one automated action based at least in part on the one or more determined anomalies, wherein performing at least one automated action comprises automatically training at least a portion of the machine learning-based anomaly detection engine using at least a portion of the one or more anomalies;

wherein the method is performed by at least one processing device comprising a processor coupled to a memory.

2. The computer-implemented method of claim 1, wherein processing the one or more correlated portions of the multiple data streams using the machine learning-based anomaly detection engine comprises processing the one or more correlated portions of the multiple data streams using an artificial neural network.

3. The computer-implemented method of claim 2, wherein the artificial neural network comprises an autoencoder comprising an input layer containing one or more nodes, an output layer containing one or more nodes, and at least one hidden layer configured to learn at least one feature in the one or more correlated portions of the multiple data streams.

4. The computer-implemented method of claim 3, wherein using the autoencoder further comprises using a mean squared error as a loss function.

5. The computer-implemented method of claim 3, wherein using the autoencoder further comprises using an Adam optimization algorithm for stochastic optimization.

6. The computer-implemented method of claim 1, wherein processing the one or more correlated portions of the multiple data streams using the machine learning-based anomaly detection engine comprises using principal component analysis and at least one direction-sensitive distance classifier algorithm.

7. The computer-implemented method of claim 1, wherein correlating the one or more portions of the multiple data streams comprises classifying workloads associated with the one or more portions of the multiple data streams based at least in part on tenant activity.

8. The computer-implemented method of claim 7, wherein correlating further comprises profiling performance of the workloads based at least in part on said classifying.

9. The computer-implemented method of claim 1, wherein performing the at least one automated action comprises mitigating at least a portion of the one or more determined anomalies.

10. The computer-implemented method of claim 1, wherein performing the at least one automated action comprises outputting one or more alerts to at least one operations entity.

11. The computer-implemented method of claim 1, wherein the multiple data streams comprise at least one of one or more data streams pertaining to performance data, one or more data streams pertaining to job allocation data, one or more data streams pertaining to trace log data, and one or more data streams pertaining to workload data.

12. A non-transitory processor-readable storage medium having stored therein program code of one or more software programs, wherein the program code when executed by at least one processing device causes the at least one processing device:

to obtain multiple data streams pertaining to one or more data center resources in at least one multi-tenant executing environment;

to correlate one or more portions of the multiple data streams by processing at least a portion of the multiple data streams using at least one multi-tenant-capable search engine comprising at least one database capable of processing at least one of one or more cross-table queries and one or more cross-index queries;

to determine one or more anomalies within the multiple data streams by processing the one or more correlated portions of the multiple data streams using a machine learning-based anomaly detection engine; and to perform at least one automated action based at least in part on the one or more determined anomalies, wherein performing at least one automated action comprises automatically training at least a portion of the machine learning-based anomaly detection engine using at least a portion of the one or more anomalies.

13. The non-transitory processor-readable storage medium of claim 12, wherein processing the one or more correlated portions of the multiple data streams using the machine learning-based anomaly detection engine comprises processing the one or more correlated portions of the multiple data streams using an artificial neural network.

14. The non-transitory processor-readable storage medium of claim 13, wherein the artificial neural network comprises an autoencoder comprising an input layer containing one or more nodes, an output layer containing one or more nodes, and at least one hidden layer configured to learn at least one feature in the one or more correlated portions of the multiple data streams.

15. The non-transitory processor-readable storage medium of claim 12, wherein correlating the one or more portions of the multiple data streams comprises classifying workloads associated with the one or more portions of the multiple data streams based at least in part on tenant activity.

16. The non-transitory processor-readable storage medium of claim 15, wherein correlating further comprises profiling performance of the workloads based at least in part on said classifying.

17. An apparatus comprising:
at least one processing device comprising a processor coupled to a memory;
the at least one processing device being configured:
to obtain multiple data streams pertaining to one or more data center resources in at least one multi-tenant executing environment;
to correlate one or more portions of the multiple data streams by processing at least a portion of the multiple data streams using at least one multi-tenant-capable search engine comprising at least one database capable of processing at least one of one or more cross-table queries and one or more cross-index queries;
to determine one or more anomalies within the multiple data streams by processing the one or more correlated portions of the multiple data streams using a machine learning-based anomaly detection engine; and
to perform at least one automated action based at least in part on the one or more determined anomalies, wherein performing at least one automated action comprises automatically training at least a portion of the machine learning-based anomaly detection engine using at least a portion of the one or more anomalies.

18. The apparatus of claim 17, wherein processing the one or more correlated portions of the multiple data streams using the machine learning-based anomaly detection engine comprises processing the one or more correlated portions of the multiple data streams using an artificial neural network.

19. The apparatus of claim 18, wherein the artificial neural network comprises an autoencoder comprising an input layer containing one or more nodes, an output layer containing one or more nodes, and at least one hidden layer configured to learn at least one feature in the one or more correlated portions of the multiple data streams.

20. The apparatus of claim 17, wherein correlating the one or more portions of the multiple data streams comprises classifying workloads associated with the one or more portions of the multiple data streams based at least in part on tenant activity.

* * * * *